United States Patent
Holness et al.

(10) Patent No.: US 9,042,395 B2
(45) Date of Patent: May 26, 2015

(54) E-SPRING SUPPORT OF ETHERNET PROTECTION

(75) Inventors: Marc Holness, Nepean (CA); Bashar Abdullah, Ottawa (CA)

(73) Assignee: CIENA CORPORATION, Hanover, MD (US)

(*) Notice: Subject to any disclaimer, the term of this patent is extended or adjusted under 35 U.S.C. 154(b) by 52 days.

(21) Appl. No.: 13/264,764

(22) PCT Filed: May 1, 2009

(86) PCT No.: PCT/CA2009/000584
§ 371 (c)(1),
(2), (4) Date: Oct. 17, 2011

(87) PCT Pub. No.: WO2010/124355
PCT Pub. Date: Nov. 4, 2010

(65) Prior Publication Data
US 2012/0033666 A1   Feb. 9, 2012

(51) Int. Cl.
H04L 12/437 (2006.01)
H04L 12/701 (2013.01)
H04L 12/42 (2006.01)
H04L 12/46 (2006.01)
H04L 12/761 (2013.01)

(52) U.S. Cl.
CPC ............... *H04L 45/00* (2013.01); *H04L 12/42* (2013.01); *H04L 12/462* (2013.01); *H04L 45/16* (2013.01)

(58) Field of Classification Search
USPC .................................................. 370/389, 406
See application file for complete search history.

(56) References Cited

U.S. PATENT DOCUMENTS

| 6,370,110 B1 | 4/2002 | Eslambolchi |
| 7,729,337 B2 * | 6/2010 | Saleh et al. .................... 370/351 |
| 2002/0036988 A1 * | 3/2002 | Cardwell et al. .............. 370/238 |
| 2002/0167899 A1 * | 11/2002 | Thompson et al. ........... 370/222 |

(Continued)

FOREIGN PATENT DOCUMENTS

| CA | 2249824 | 4/2000 |
| WO | WO2005083913 | 9/2005 |

OTHER PUBLICATIONS

"Recommendation ITU-T G.8032/Y.1344—Amendment 1", Apr. 2009, pp. 1-20.*

(Continued)

*Primary Examiner* — Derrick Ferris
*Assistant Examiner* — Scott M Sciacca
(74) *Attorney, Agent, or Firm* — Kent Daniels; Daniels IP Services Ltd.

(57) ABSTRACT

A method of routing traffic through a packet network having a mesh physical topography. At least two types of network primitive are defined, each type of network primitive providing a respective model of traffic forwarding through at least two neighbor nodes of the network. A network model encompassing at least a portion of the network is constructed using a set of two or more interconnected network primitives. The network model has nodes and links corresponding to respective nodes and lines of the network. Respective forwarding information is computed for each node of the network model. For each node of the network model, the respective computed forwarding information is installed in a forwarding database of the corresponding node of the network, such that traffic is forwarded by each node of the network in accordance with the respective computed forwarding information.

10 Claims, 4 Drawing Sheets

(56) References Cited

U.S. PATENT DOCUMENTS

| | | | |
|---|---|---|---|
| 2003/0031123 A1* | 2/2003 | Gilmour et al. | 370/216 |
| 2003/0067867 A1* | 4/2003 | Weis | 370/210 |
| 2003/0223357 A1* | 12/2003 | Lee | 370/218 |
| 2004/0054807 A1* | 3/2004 | Harvey et al. | 709/243 |
| 2005/0094577 A1* | 5/2005 | Ashwood-Smith | 370/257 |
| 2005/0198524 A1* | 9/2005 | Benvenuti et al. | 713/200 |
| 2006/0098671 A1* | 5/2006 | Shachnai et al. | 370/404 |
| 2007/0076719 A1* | 4/2007 | Allan et al. | 370/392 |
| 2007/0083907 A1* | 4/2007 | Serbest et al. | 725/112 |
| 2007/0237072 A1* | 10/2007 | Scholl | 370/222 |
| 2007/0280251 A1* | 12/2007 | Wang et al. | 370/395.1 |
| 2008/0095047 A1* | 4/2008 | Skalecki et al. | 370/225 |
| 2009/0059800 A1* | 3/2009 | Mohan | 370/241.1 |

OTHER PUBLICATIONS

Recommendation ITU-T G.8032/Y.1344 was approved on Jun. 22, 2008 by ITU-T Study Group 15 (2005-2008) under Recommendation ITU-T A.8 procedure. pp 1-46.

* cited by examiner

E-SPRING SUPPORT OF ETHERNET PROTECTION

TECHNICAL FIELD

The present invention relates to management of traffic forwarding in packet networks, and in particular to methods of preventing loops in multicast routes mapped through a packet network.

BACKGROUND OF THE INVENTION

Ethernet is increasingly popular as a transport network for high speed Wide Area Network (WAN) communications. Various techniques have been developed to enable the deployment of Ethernet transport networks with a mesh topology. This enables the provisioning of diverse paths for traffic protection, and has proven to be popular with network operators and carriers. However, Ethernet requires that traffic forwarding through the network must be controlled to prevent loops.

Spanning Tree Protocol (STP) is frequently used to compute traffic forwarding paths through a mesh network, in such a manner that loops are prevented. In effect, STP converts the mesh network topology into a tree topology. If a network failure (such as a node or link failure) occurs, the tree must be re-computed to re-establish connectivity. In order to prevent network instability and formation of loops during the tree recomputation, all traffic through the tree is terminated until the new tree has been computed, and forwarding state implementing the new tree installed in each node. In large mesh networks, this can require several seconds.

Faster recovery times can be obtained by localizing failures to a particular branch. With this arrangement, the branch of the tree that is directly affected by the detected failure is "pruned", and a new branch recomputed, starting from the root of the pruned branch. This has an advantage in that only traffic to the nodes directly affected by the network failure is interrupted, while traffic is permitted to flow through the rest of the network. However, in this case, the failure recovery time is dependent on the location of the failure, and the topology of the tree, and so can be unpredictable.

Another approach is to compute two (or more) topologically diverse trees from each node, to every other node. With this arrangement, each node is the "root" of a pair of trees, one of which can be designated as a working tree, and the other as a protection tree. If a network failure affecting the working tree is detected, a failure indication message is propagated to the root node, which can then "switch" traffic to the protection tree. In this case, the failure recovery time is principally dependent on the time required for the failure indication message to propagate to the root node, which can be relatively fast. However, this method requires the computation of a very large number of trees within the network, and it can be very difficult to guarantee topological diversity between the working and protection trees.

For Ethernet transport networks, it would be desirable to obtain failure recovery times comparable to those obtained in physical layer transport technologies such as Synchronous Optical Network/Synchronous Digital Hierarchy SONET/SDH, that is; 50 mSec, or less. In theory, techniques based on the pre-computation of working and protection paths are capable of achieving this level of protection switching performance. However, this performance comes at a cost of great complexity. A simpler solution is desired.

ITU-T SG 15/Q9 recommendation G.8032 (February, 2008) describes protection switching in an Ethernet ring. Referring to FIG. 1, an Ethernet ring 2 is an Ethernet network comprising nodes 4 and links 6 connected together in a ring topology. One of the links of the ring is designated as a Ring Protection Link (RPL), and is disabled during normal operation of the ring by placing a channel block 8 on that link. Typically, a channel block 8 is imposed at a node at one end of the RPL. This node may then be referred to as the RPL Owner. In some cases, the channel block 8 may, for example, comprise a policy that prevents packets of the ring from being forwarded through a port hosting the RPL. With such a channel block in place, the ring is guaranteed to be loop free, and conventional Ethernet MAC-learning and path computation can be used to compute forwarding state in each node 4 of the ring 2.

As described in ITU-T recommendation G.8032, a failure of either a link 6 or a node 4 of the ring 2 will be detected by the two nodes nearest the point of failure. Both of these nodes will install a channel block on the port facing the fault and will send a Failure Indication Message (FIM) to their adjacent nodes in the ring. These FIMs will be propagated, in opposite directions, around the ring. Upon receipt of the initial FIM, each node flushes its forwarding database (FDB), and forwards the FIM to the next node on the ring. In addition, the RPL-Owner will remove the channel block 8. This effectively enables connectivity within the ring to be re-established using conventional Ethernet flooding and MAC learning functionality. A convenient aspect of this approach is that the conventional Ethernet flooding behaviour forwards traffic into the ring as the primary mechanism for MAC learning and path computation. As a result, traffic flow within the ring is restored almost immediately after the FDB in each node 4 has been flushed, so that the failure recovery time of the network 2 is dominated by the speed at with the FIMs propagate around the ring. Failure recovery times of 50 msec or less can readily be obtained in practical WANs. However, ITU/T recommendation G.8032 is based on a ring network topology. No comparable scheme is available for implementation in a mesh network.

SUMMARY OF THE INVENTION

Thus, an aspect of the present invention provides a method of routing traffic through a packet network having a mesh physical topography. At least two types of network primitive are defined, each type of network primitive providing a respective model of traffic forwarding through at least two neighbour nodes of the network. A network model encompassing at least a portion of the network is constructed using a set of two or more interconnected network primitives. The network model has nodes and links corresponding to respective nodes and lines of the network. Respective forwarding information is computed for each node of the network model. For each node of the network model, the respective computed forwarding information is installed in a forwarding database of the corresponding node of the network, such that traffic is forwarded by each node of the network in accordance with the respective computed forwarding information.

An advantage of the present invention is that, ring protection schemes such as those defined in ITU/T recommendation G.8032 can be implemented in a mesh network, thereby enabling high speed robust failure recovery within the network.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a method of supporting high speed protection switching in an Ethernet network having a mesh topology. Embodiments of the invention are described below, by way of example only, with reference to FIGS. 2-5.

The present invention provides a pair of network primitives, comprising a ring and a sub-ring. Both of these network primitives are layer-2 (or higher) constructs, so that a set of network primitives can be used to model a network having a different physical topology, such as a mesh.

Figure 1:
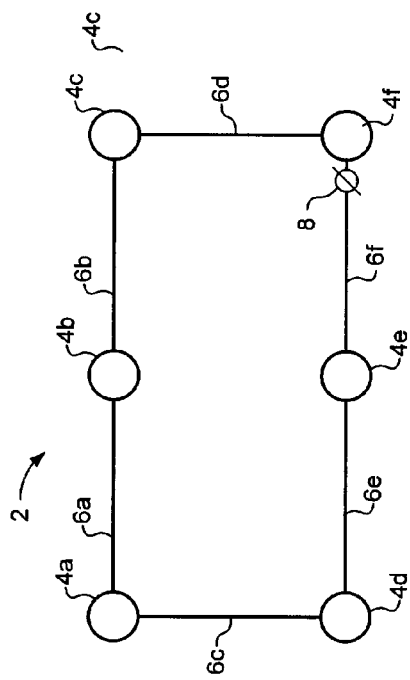
FIG. 1 is a schematic illustration of a network having a ring topology known, for example from ITU/T recommendation G.8032.
Figure 2B:
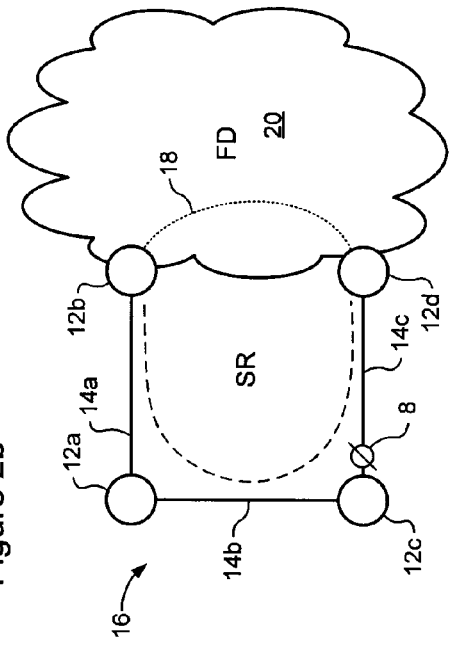
FIGS. 2a-2b schematically illustrate respective network primitives in accordance with an aspect of the present invention.
Figure 2A:
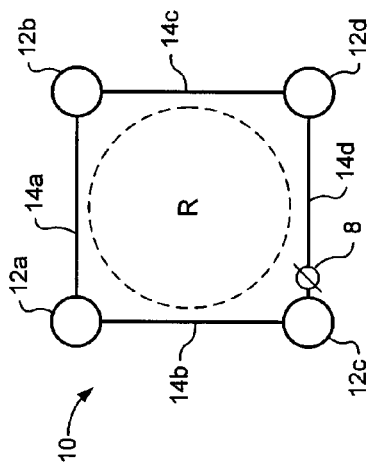

As may be seen in FIG. 2a, a ring network primitive 10 models a conventional Ethernet network (or sub-network) of neighbour nodes 12 and links 14 connected in a ring topology. In the illustrated embodiments, the ring network primitive 10 provides traffic forwarding, channel blocking and protection schemes of the type known, for example, from ITU-T recommendation G.8032 described above. For convenience, a ring network primitive 10 may be referred to herein simply as a ring, or an Ethernet ring.

Referring to FIG. 2b, a sub-ring network primitive 16 models an Ethernet network (or sub-network) which comprises two or more neighbour nodes 12 interconnected by links 14 to form a linear path extending between two "end-nodes" (nodes 12b and 12d in FIG. 2b). The ring topology of the sub-ring network primitive 16 is "closed" by way of a virtual connection (or link) 18 extending through a foreign network domain 20 between the two end-nodes 12b and 12d. In this respect, the term "foreign network domain" should be understood to mean any network domain that is not part of the sub-ring itself, but is otherwise capable of providing a path to transport packets between the two end nodes. Any link of the sub-ring network primitive 16, except the virtual link 18, may be designated as the Ring Protection Link (RPL), and either node hosting the RPL can be designated as the RPL-Owner. In this way, traffic forwarding, channel blocking and protection schemes of the type known, for example, from ITU-T recommendation G.8032 described above can be implemented in the sub-ring network primitive 16, with packet transport through the virtual link 18 to ensure continuity of the ring topology. In some embodiments, sub-ring control messages, such as Failure Indication Messages can be transported through the virtual link 18. In other cases, sub-ring control messages can be terminated at the end-nodes, so that they are not forwarded through the virtual link 18. This later option is workable because the virtual link 18 emulates a direct physical link between the two end nodes, and it is only the end nodes that will act upon any sub-ring control messages sent through the virtual link 18. However, the topology of the sub-ring network primitive 16 ensures that all of the nodes of the sub-ring, including the end nodes, will automatically receive all sub-ring control messaging through the sub-ring itself, and it is not necessary to forward control messages through the virtual link 18 in order to guarantee this outcome. Thus, proper traffic forwarding and protection switching functionality of the sub-ring can be obtained without sending sub-ring control messages through the virtual link 18.

As may be appreciated, allocation of physical network resources to each network primitive can be done in a variety of ways. For example, in an Ethernet network, each network primitive may be assigned a respective Virtual Local Area Network Identifier (VLAN-ID), or, alternatively, a respective Bearer VLAN-ID (B-VID). This arrangement enables known techniques to be used to compute and install Forwarding Database (FDB) entries for each node implementing a given network primitive. A connection between two network primitives can be implemented by way of a translation function at the point (node) at which the two network primitives are connected.

For example, consider a network in which each network primitive is defined using a respective VLAN-ID, and a packet flow (which may, for example, be identified by the source and destination addresses) traverses a node between two interconnected network primitives. In this case, packets received by the node will have the VLAN-ID of the first network primitive. The translation function will then replace this VLAN-ID with the corresponding ID of the second network primitive, so that conventional packet forwarding techniques will operate to transmit the packet through the second network primitive.

It can be shown that any network having a physical mesh topology can be modeled using ring and sub-ring network primitives which are interconnected in accordance with the following rules: a network primitive can be connected to any number of other network primitives of either type; the end-nodes of a sub-ring network primitive may be connected to a common network primitive or different network primitives, as desired; connections between network primitives occur exclusively at nodes, thus a network primitive cannot be connected to another network primitive via a shared link.

Figure 3C:
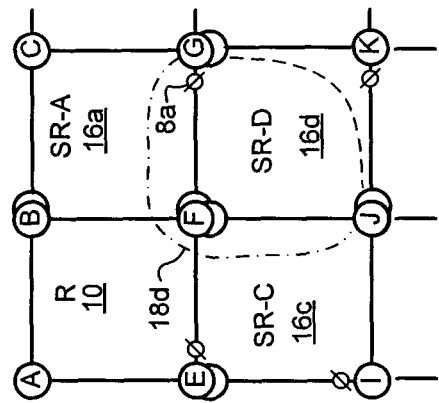
FIGS. 3a-3d schematically illustrate modeling of a representative mesh network using the network primitives of FIGS. 2a-2b.
Figure 3D:
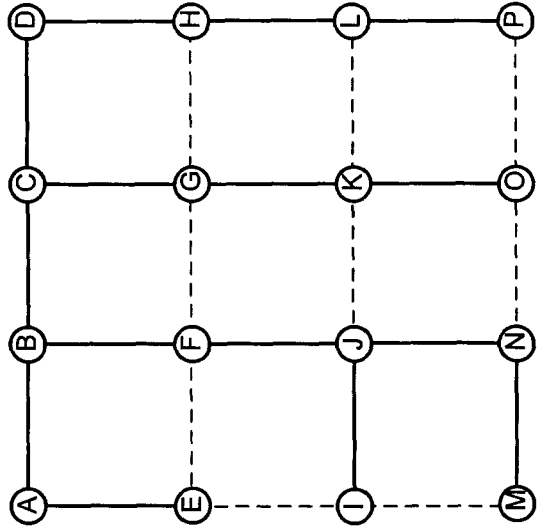
Figure 3A:
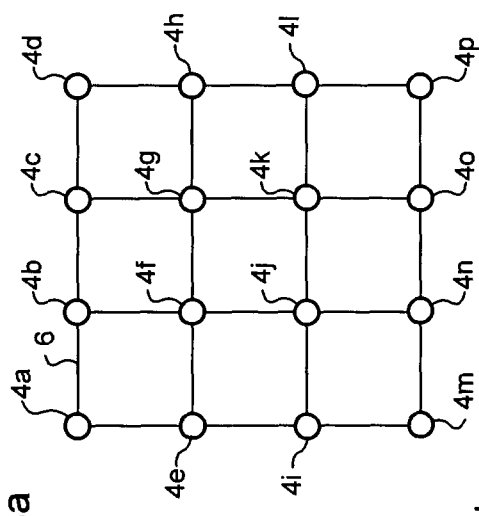

For example, FIG. 3a schematically shows a mesh network comprising sixteen physical nodes 4 interconnected by physical links 6. As will be appreciated, the network of FIG. 3a is arbitrary, and chosen simply for convenience of illustration. The present invention can be implemented in any packet network having a physical mesh topology.

Figure 3B:
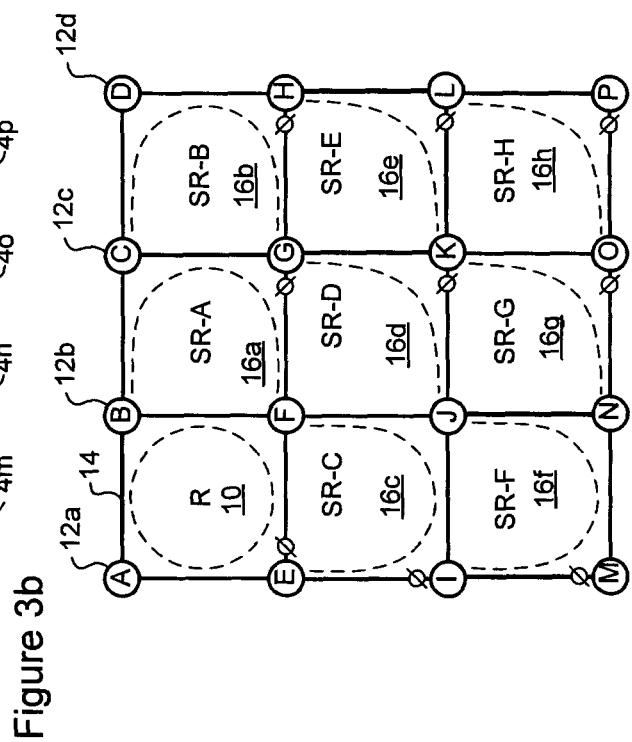

As shown in FIG. 3b, the physical mesh network of FIG. 3a can be modeled using a set of interconnected ring 10 and sub-ring 16 network primitives. In the embodiment of FIG. 3b, a single ring network primitive 10 is used in combination with eight sub-ring network primitives 16a-h. Of course, other combinations of ring and sub-ring primitives are equally possible, and may be used. As may be seen in FIGS. 3a and 3b, each physical link 6 of the mesh network (FIG. 3a) corresponds with a link 14 of one of the network primitives 10, 16, so that the topology of the network model of FIG. 3b exactly follows that of the physical network.

As may be seen in FIG. 3b, each sub-ring network primitive 16 is connected to at least one other network primitive (either ring or sub-ring). With this arrangement, for each sub-ring network primitive 16, the rest of the network serves as the "foreign network domain" through which a virtual link 18 (not shown in FIG. 3b) which closes the "ring" topology of that network primitive can be mapped. Thus, for example, as shown in FIG. 3c, sub-ring SR-D 16d (comprising nodes J-K-G) is closed by a virtual link 18*d* which extends through sub-ring SR-A 16*a*; ring R 10 and sub-ring SR-C 16*c* between nodes J and G. The actual path traversed by the virtual link does not materially affect the proper functioning of sub-ring SR-D, provided only that appropriate translation functions are implemented at each connection point traversed by the virtual link, so that, for example, end-node J can receive packets from end-node G, via the virtual link, and can forward these packets through sub-ring SR-D (to node K) as if nodes G and J were connected by a direct physical link.

In this respect, it will be noted that the placement (and effect) of a channel block 8 pertains only to the network primitive within which the channel block 8 is defined. For example, in FIG. 3*c*, sub-ring SR-A 16*a* includes a channel block 8*a* on link F-G. This means that link F-G is the RPL for sub-ring SR-A 16*a*, and nodes F and G are blocked from forwarding traffic of sub-ring SR-A 16*a* through that link. However, the presence of this SR-A's channel block on link F-G does not prevent the forwarding of packets that do not belong to SR-A through that same link. Thus, for example, it is entirely possible for SR-D's virtual link 18*d* to be mapped through link F-G of SR-A 16*a*, since the traffic being forwarded though the virtual link 18*d* does not belong to sub-ring SR-A 16*a*.

Within the network model (FIG. 3*b*), loops are prevented by the presence of a channel block 8 in each network primitive 10,16. It can be shown that the entire network can be maintained loop-free provided each network primitive 10,16 contains an RPL with a channel block 8, as described above. In the Example network of FIG. 3, the presence of channel blocks 8 at the locations shown force traffic flows within the network model to follow the logical connection pattern illustrated in FIG. 3*d*.

Figure 4B:
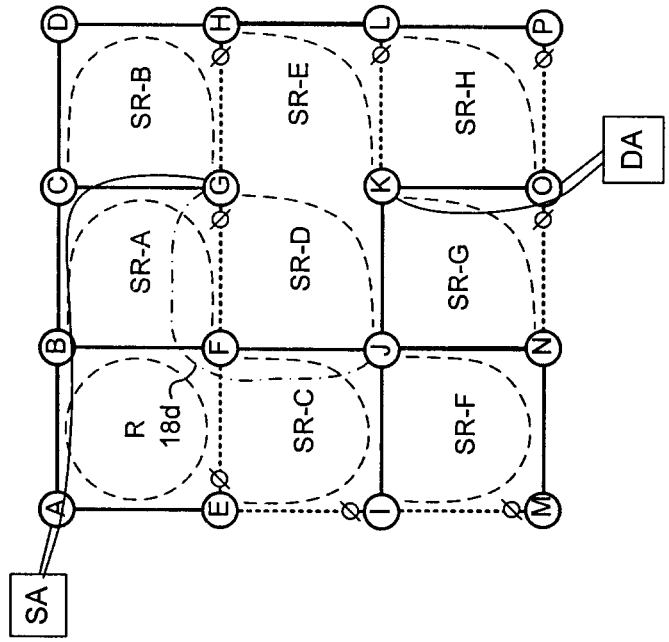
FIGS. 4a-4c schematically illustrate failure recovery in the network of FIGS. 3a-d.

Referring again to FIGS. 3*a* and 3*b*, it will be seen that each link 6 of the physical network (FIG. 3*a*) is associated with only one network primitive 10,16. In other words, the resources of any given physical link 6 are never shared between two network primitives 10,16. This arrangement is beneficial in that it facilitates "containment" of physical link failures. For example, FIGS. 4*a*-4*c* illustrate a recovery from a physical link failure, in the network of FIGS. 3*a*-*d*.

Figure 4A:
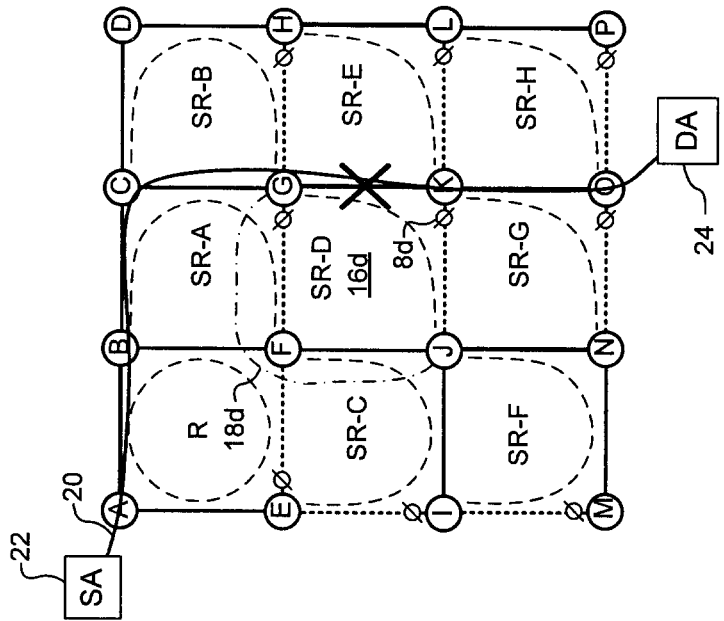
Figures 4C, 5:
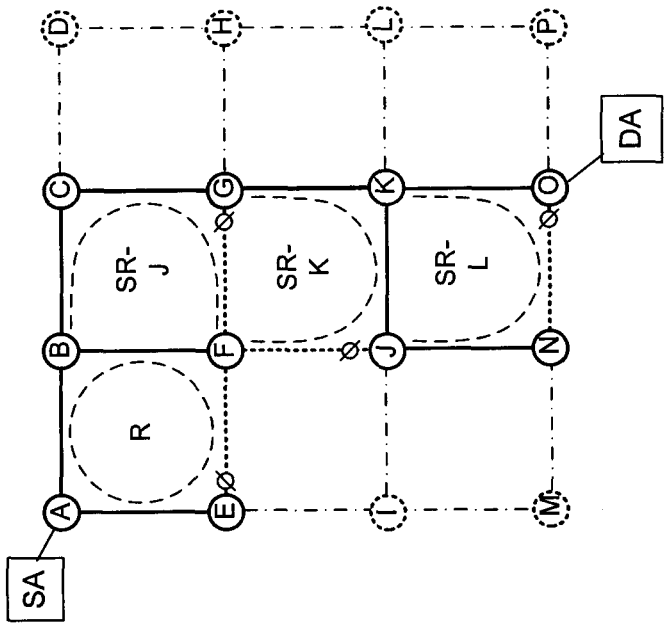
FIG. 5 schematically illustrates an alternative model of the mesh network of FIG. 3a using the network primitives of FIGS. 2a-2b.

Referring to FIG. 4*a*, an end-to-end path 20 is mapped through the network between a Source Address (SA) 22 and a Destination Address (DA) 24 attached to the network at nodes A and O, respectively. A physical failure affecting link G-K is also shown. Following the example of FIG. 3, this link is associated with sub-ring SR-D 16*d*. Following the failure recovery mechanism outlined in ITU-T recommendation G.8032 described above, the failure of link G-K will be detected at nodes G and K of sub-ring SR-D 16*d*, both of which will generate and forward Failure Indication Messages (FIMs) though sub-ring SR-D. Since node K is the RPL-Owner for sub-ring SR-D 16*d*, node K flushes its FDB and removes the channel block 8*d*, and forwards its FIM to node J. Nodes J and G are both end-nodes of sub-ring SR-D 16*d*. Accordingly, these nodes flush their respective FDBs, and forward the FIMs to each other through the SR-D's virtual link 18*d*. This results in the logical network topology shown in FIG. 4*b*.

Referring to FIG. 4*b*, link G-K has failed, and so is no longer available (and thus not shown). The channel block 8*d* on link J-K has been removed, so link J-K is now available to carry traffic of sub-ring SR-D 16*d*. In addition, the FDB entries for the traffic flow, within sub-ring SR-D have been flushed, and so end-to-end traffic between SA 22 and DA 24 is interrupted. However, propagation of FIMs has been restricted to within sub-ring SR-D 16*d*, so that forwarding state for this traffic flow is retained in all nodes that are not part of sub-ring SR-D 16*d*. Consequently, packets originating at SA 22 will be forwarded through nodes A, B and C, and so will be received at node G (on sub-ring SR-A 16-*a*) and the VLAN-ID translated to that of sub-ring SR-D 16*d*. However, node G will not have forwarding state for sub-ring SR-D 16*d* (having just flushed its FDB), and so will flood the packets into sub-ring SR-D 16*d*. Because link G-K is not available, these packets will be forwarded through SR-D's virtual link 18*d*, and thus will arrive at node J. Node J will forward the packets to node K through link J-K, because that link is now active due to earlier removal of the channel block 8*d*. Upon receipt of the packets at node K, end-to-end connectivity is restored as shown in FIG. 4*c*, and forwarding state installed in nodes K, J and G in a conventional manner.

In the foregoing examples, network primitives are defined which encompass, and model, the entire physical network. However, it will be appreciated that this is not essential. May alternative variations are possible, all within the scope of the present invention. In general, there can be as many different network primitives as there are identifiers used to identify them. A set of interconnected network primitives can be defined to model an entire mesh network, or a desired portion of it. Multiple such sets of interconnected network primitives can be defined, each of which models a respective portion of the network. These sets may, or may not over lap, as desired. For example, it is frequently desirable to define point-to-point (e-line) connections between Source and Destination Addresses (nodes) in the network. As described above, some protection-switching strategies use two or more of such point-to-point paths, and try to ensure topologically diversity between the two paths. Instead, a chain of ring and sub-ring network primitives can be defined between the two nodes, as shown in FIG. 5. In this case, each network primitive provides fault containment and rapid (sub 50 mSec) protection switching within its own local portion of the network, so that reliable connectivity is established without the difficulties associated with attempting to define topologically diverse paths between the involved source and destination nodes. As may be appreciated, directly analogous methods can be employed in the case of multi-cast (point-to multipoint) scenarios.

As mentioned above, in some embodiments, each network primitive may be identified using a respective VLAN-ID. In the scenario of FIG. 5, it may be convenient to use a B-VID to identify a chain (or set) of interconnected network primitives, which enables conventional traffic labelling and forwarding techniques to provide proper end-to-end traffic forwarding through the chain. Multiple chains can be defined in the network, each of which is identified using a respective B-VID. These chains may over-lap. Thus, for example, the chain illustrated in FIG. 5 can co-exist with the mesh shown in FIGS. 3 and 4, by assigning a unique VLAN-ID to each network primitive, and associating appropriate sets of network primitives (VLAN-IDs) to respective unique B-VIDs.

As may also be seen in FIGS. 3-5, the primitives assigned to one B-VID may or may not be topologically similar to those assigned to a different B-VID, even when modelling the same portion of the network. For example, in the mesh network of FIGS. 3-4, sub-ring SR-D 16*d* encompasses nodes J, K and G, and the direct links connecting them. In the chain of FIG. 5, sub-ring SR-K models the same region of the physical network, but encompasses nodes F, J, K and G, and their intervening direct links.

The embodiment(s) of the invention described above is(are) intended to be exemplary only. The scope of the invention is therefore intended to be limited solely by the scope of the appended claims.

We claim:

1. A method of routing traffic through a packet network having physical nodes interconnected by physical links in a mesh physical topography, the method comprising:
   defining at least two types of network primitive, including:
      a ring network primitive comprising a model of bi-directional traffic forwarding through at least two neighbour nodes interconnected in a ring topology; and
      a sub-ring network primitive comprising a model of bi-directional traffic forwarding through at least two neighbour nodes interconnected in a linear topology between first and second end-nodes, and between the first and second end-nodes via a virtual link mapped though at least one other network primitive;
   defining a network model encompassing at least a portion of the network, using at least one ring network primitive and at least two of the sub-ring network primitives, such that each physical node and physical link of the network is associated with a respective network primitive of the network model, and the respective virtual link of a first one of the sub-ring network primitives is mapped through at least another one of the sub-ring network primitives;
   computing respective forwarding information for each physical node of the network, based on the network model; and
   for each physical node of the network, installing the respective computed forwarding information in a forwarding database associated with the physical node, such that traffic is forwarded by each physical node of the network in accordance with the respective computed forwarding information; and
   restoring end-to-end connectivity using the respective virtual link of a given sub-ring network primitive following a network failure affecting traffic forwarding through a physical link of the network associated with the given sub-ring network primitive.

2. The method as claimed in claim 1, wherein the step of modelling at least a portion of the network comprises:
   instantiating a plurality of network primitives, and allocating each network primitive to a respective portion of the network such that:
      the topology of each network primitive matches that of the physical network to which it is allocated; and
      each physical link of the network is associated with only one network primitive;
   identifying each node of the network model at which a first network primitive is connected to a second network primitive; and
   at each identified node, instantiating a forwarding function defining traffic forwarding between the first and second network primitives.

3. The method as claimed in claim 2, wherein the step of identifying each node of the network model at which a first network primitive is connected to a second network primitive comprises identifying each node of the network model that is allocated to respective nodes of both of the first and second network primitives.

4. The method as claimed in claim 2, wherein the step of instantiating a forwarding function comprises instantiating a mapping function for modifying at least a header of packets traversing the node between the first and second network primitives.

5. The method as claimed in claim 4, wherein the network is an Ethernet network and each network primitive is identified by a respective VLAN identifier, and wherein the mapping function modifies the VLAN identifier of packets traversing the respective physical node between the first and second network primitives.

6. A system for routing traffic through a packet network, the system comprising:
   a plurality of physical nodes;
   a plurality physical links of a network interconnecting the plurality of physical nodes in a mesh topography;
   a network model encompassing at least a portion of the network, the network model comprising a model of packet forwarding within the portion of the network using a plurality of network primitives, such that each physical node and physical link of the network is associated with a respective network primitive of the network model, the plurality of network primitives including:
      at least one ring network primitive comprising a model of bi-directional traffic forwarding through at least two neighbour nodes interconnected in a ring topology; and
      at least two sub-ring network primitives, each sub-ring network primitive comprising a model of bi-directional traffic forwarding through at least two neighbour nodes interconnected in a linear topology between first and second end-nodes, and between the first and second end-nodes via a virtual link mapped though at least one other network primitive in the network model, wherein the respective virtual link of a first one of the sub-ring network primitives is mapped through at least another one of the sub-ring network primitives; and
   a forwarding database associated with one or more respective physical nodes of the network, the forwarding database including forwarding information computed for each respective physical node based on the network model;
   forwarding, by each physical node of the network, traffic in accordance with its respective forwarding information in the forwarding database; and
   restoring, by each physical node of the network, end-to-end connectivity using the respective virtual link of a given sub-ring network primitive following a network failure affecting traffic forwarding through a physical link of the network associated with the given sub-ring network primitive.

7. The system as claimed in claim 6, wherein the network model comprises:
   for each node at which a first network primitive is connected to a second network primitive, a respective forwarding function defining traffic forwarding between the first and second network primitives.

8. The system as claimed in claim 7, wherein the forwarding function comprises a mapping function for modifying at least a header of packets traversing the node between the first and second network primitives.

9. The system as claimed in claim 8, wherein the network is an Ethernet network and each network primitive is identified by a respective VLAN identifier, and wherein the mapping function modifies the VLAN identifier of packets traversing the node between the first and second network primitives.

10. A non-transitory computer readable storage medium comprising software instructions for controlling a general purpose computer to execute a method of routing traffic through a packet network having a mesh physical topography, the method comprising:
   defining at least two types of network primitive, including:

a ring network primitive comprising a model of bi-directional traffic forwarding through at least two neighbour nodes interconnected in a ring topology; and a sub-ring network primitive comprising a model of bi-directional traffic forwarding through at least two neighbour nodes interconnected in a linear topology between first and second end-nodes, and between the first and second end-nodes via a virtual link mapped though at least one other network primitive;

defining a network model encompassing at least a portion of the network, using at least one ring network primitive and at least two of the sub-ring network primitives, such that each physical node and physical link of the network is associated with a respective network primitive of the network model, and the respective virtual link of a first one of the sub-ring network primitives is mapped through at least another one of the sub-ring network primitives;

computing respective forwarding information for each node of the network, based on the network model; and for each node of the network, installing the respective computed forwarding information in a forwarding database of the node, such that traffic is forwarded by each node of the network in accordance with the respective computed forwarding information; and restoring end-to-end connectivity using the respective virtual link of a given sub-ring network primitive following a network failure affecting traffic forwarding through a physical link of the network associated with the given sub-ring network primitive.

* * * * *